(12) United States Patent
Keller et al.

(10) Patent No.: US 9,927,515 B2
(45) Date of Patent: Mar. 27, 2018

(54) LIQUID CRYSTAL WAVEGUIDE STEERED ACTIVE SITUATIONAL AWARENESS SENSOR

(71) Applicant: Raytheon Company, Waltham, MA (US)

(72) Inventors: Sean D. Keller, Tucson, AZ (US); Gerald P. Uyeno, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 302 days.

(21) Appl. No.: 14/748,928

(22) Filed: Jun. 24, 2015

(65) Prior Publication Data

US 2016/0377706 A1 Dec. 29, 2016

(51) Int. Cl.
| | |
|---|---|
| *G01S 17/08* | (2006.01) |
| *G02F 1/29* | (2006.01) |
| *G01S 7/481* | (2006.01) |
| *G01S 17/42* | (2006.01) |

(52) U.S. Cl.
CPC ............ *G01S 7/4817* (2013.01); *G01S 17/42* (2013.01); *G02F 1/29* (2013.01)

(58) Field of Classification Search
CPC .......... G01S 7/4817; G01S 17/42; G02F 1/29; G02F 1/295; G02F 1/1326; G02F 1/2955; G02F 2203/24; G02B 5/3025; H01S 3/1003; H01S 3/0071

USPC .......................................... 356/5.01; 359/303
See application file for complete search history.

(56) References Cited

U.S. PATENT DOCUMENTS

| | | | | |
|---|---|---|---|---|
| 3,838,908 A | * | 10/1974 | Channin | ............... G02F 1/1326 349/19 |
| 6,130,783 A | | 10/2000 | Yagi et al. | |
| 7,135,672 B2 | | 11/2006 | Land | |
| 7,720,116 B2 | * | 5/2010 | Anderson | ............... H01S 5/143 372/20 |
| 7,969,558 B2 | | 6/2011 | Hall | |
| 8,767,190 B2 | | 7/2014 | Hall | |

* cited by examiner

*Primary Examiner* — Daniel L Murphy
(74) *Attorney, Agent, or Firm* — Eric A. Gifford (57) ABSTRACT

An active situational sensor achieves SWaP-C and SNR improvements by using a liquid crystal waveguide to steer a spot-beam onto a conical shape of a fixed mirror, which redirects the spot-beam to scan a FOV. The sensor may rapidly scan a 360° horizontal FOV with a specified vertical FOV or any portion thereof, jump discretely between multiple specific objects per frame, vary the dwell time on an object or compensate for other external factors to tailor the scan to a particular application or changing real-time conditions. The sensor can be used to provide object intensity or ranging in complex, dynamic systems such as aviation, air traffic control, ship navigation, unmanned ground vehicles, collision avoidance, object targeting etc.

19 Claims, 9 Drawing Sheets

SECTION B-B
FIG.4d

| # | CONFIGURATION | CW LASER | PULSED LASER | LCWG | L1 | FIXED MIRROR | L2 | L3 | DETECTOR | NOTES |
|---|---|---|---|---|---|---|---|---|---|---|
| 1 | A0 CW | X | | X | | | | | | A0 FOR CW OPERATION |
| 2 | A0 P | | X | X | | X | | | X | A0 FOR PULSED OPERATION |
| 3 | A0 FD CW | X | | X | | X | | X | X | A0 CW WITH FOLD OPTICS |
| 4 | A0 FD P | | X | X | | X | | X | X | A0 P WITH FOLD OPTICS |
| 5 | A01 CW | X | | X | X | | | | | A01 (A0 WITH L1) FOR CW OPERATION |
| 6 | A01 P | | X | X | X | X | | | X | A01 FOR PULSED OPERATION |
| 7 | A01 FD CW | X | | X | X | X | | X | X | A01 CW WITH FOLD OPTICS |
| 8 | A01 FD P | | X | X | X | X | | X | X | A01 P WITH FOLD OPTICS |
| 9 | A02 CW | X | | X | | | X | | X | A02 (A0 WITH L2) WITH A DETECTOR FOR CW OPERATION |
| 10 | A02 P | | X | X | | X | X | | X | A02 FOR PULSED OPERATION |
| 11 | A02 FD CW | X | | X | | X | X | X | X | A02 CW WITH FOLD OPTICS |
| 12 | A02 FD P | | X | X | | X | X | X | X | A02 P WITH FOLD OPTICS |
| 13 | A012 CW | X | | X | X | | X | | X | A012 (A0 WITH L1 AND L2) FOR CW OPERATION |
| 14 | A012 P | | X | X | X | X | X | | X | A012 FOR PULSED OPERATION |
| 15 | A012 FD CW | X | | X | X | X | X | X | X | A012 CW WITH FOLD OPTICS |
| 16 | A012 FD P | | X | X | X | X | X | X | X | A012 P WITH FOLD OPTICS |

FIG.5

LIQUID CRYSTAL WAVEGUIDE STEERED ACTIVE SITUATIONAL AWARENESS SENSOR

BACKGROUND OF THE INVENTION

Field of the Invention

This invention relates to situational awareness sensors, and more particularly to the use of a liquid crystal waveguide (LCWG) to steer a laser spot-beam over a sensor field-of-view (FOV) with no moving parts.

Description of the Related Art

Situational awareness is the perception of environmental elements with respect to time or space, the comprehension of their meaning, and the projection of their status after some variable has changed, such as time, or some other variable, such as a predetermined event. Situational awareness is critical in complex, dynamic systems such as aviation, air traffic control, ship navigation, collision avoidance, object targeting etc.

Situational awareness sensors may be passive or active. Passive sensors use a detector and ambient energy to detect and track objects in the sensor's FOV. Active sensors use a laser to illuminate objects in the FOV and a detector to detect reflected energy. The active sensor may be configured to produce an intensity image or a range map of the illuminated object. Active sensors have the advantages of illuminating a target with a laser and being able to provide range information. However, lasers can be large and expensive and raise the overall "SWaP-C" (size, weight, power and cost) of the sensor.

One type of active sensor uses flash illumination to simultaneously illuminate the entire FOV and a pixelated detector to detect reflected energy. This approach requires a laser with a lot of power, hence size, weight and cost, to provide the requisite energy density over the FOV to detect objects at typical distances. Flash illumination also produces atmospheric backscatter that reduces the signal-to-noise ratio (SNR) of the detected objects. Flash illumination does have the benefit of no moving parts.

Another type of active sensor uses a single laser to generate a collimated spot-beam. A mirror is physically rotated to scan the collimated spot-beam over a 360 degree horizontal FOV. The entire sensor may be actuated up and down to scan a desired vertical FOV. A single detector senses a reflected component of the spot-beam. This approach can use a less powerful laser and avoids atmospheric backscattering but is mechanically scanned.

Velodyne Lidar offers a suite of LIDAR sensors that provide a 360 degree horizontal FOV and a 30-40 degree vertical FOV for real-time autonomous navigation, 3D mobile mappig and other LIDAR applications (U.S. Pat. Nos. 7,969,558 and 8,767,190). The LIDAR sensor includes a base, a housing, a plurality of photon transmitters and photon detectors contained within the housing, a rotary motor that rotates the housing about the base, and a communication component that allows transmission of signals generated by the the photon detectors to external components. The photon transmitters and detectors of each pair are held in a fixed relationship with each other. The rotary component includes a rotary power coupling configured to provide power from an external source to the rotary motor, the photon transmitters, and the photon detectors. This approach uses many small emitter/detector pairs but requires mechanical rotation to scan the horizontal FOV.

SUMMARY OF THE INVENTION

The following is a summary of the invention in order to provide a basic understanding of some aspects of the invention. This summary is not intended to identify key or critical elements of the invention or to delineate the scope of the invention. Its sole purpose is to present some concepts of the invention in a simplified form as a prelude to the more detailed description and the defining claims that are presented later.

The present invention provides an active situational awareness sensor that achieves SWaP-C and SNR improvements by scanning a spot-beam with no moving parts. The sensor may be positioned in any horizontal or vertical direction and may rapidly scan a 360° horizontal FOV in the plane perpendicular to the axis of the sensor with a specified vertical FOV perpendicular to the plane of the scan. The sensor may also scan any portion of the FOV, jump between multiple discrete objects per frame, vary the dwell time on an object or compensate for other external factors to tailor the scan to a particular application or changing real-time conditions.

In an embodiment, a situational awareness sensor comprises a laser (CW or pulsed) configured to generate a collimated spot-beam along an optical axis that is oriented in the Z direction and a liquid crystal waveguide (LCWG) along the optical axis responsive to command signals to steer the spot-beam about the optical axis to a location Theta X and Theta Y from the optical axis. Theta X is the angle between the projection of the instantaneous location of the axis of the spot-beam on the X-Z plane and the Z-axis and Theta Y is the angle between the instantaneous location of the axis of the spot-beam on the Y-Z plane and the Z-axis. Theta Z is the angle between the projection of the instantaneous location of the axis of the steered spot-beam and the Z axis.

A controller is configured to issue command signals to the LCWG to steer the spot-beam to the desired Theta X and Theta Y. A fixed mirror having a conical shape and oriented along the optical axis redirects the spot-beam to a location Phi and Theta Z' where Phi is the angle between the projection of the instantaneous location of the axis of the redirected spot-beam on the X-Y plane and the X-axis and Theta Z' is the angle between the projection of the instantaneous location of the axis of the redirected spot-beam on the Z-axis. Theta Z' is greater than Theta Z. The redirected spot-beam scans a field-of-view (FOV) defined by the values of Phi and Theta Z'. A detector is configured to sense a reflected component of the spot-beam, which can be processed to provide intensity or range.

In different embodiments, the sensor may include different combinations of optical components L1, L2 and L3. Optic L1 is configured to focus the collimated spot-beam onto the conical shape of the fixed mirror. Optic L2 is configured to collimate the redirected spot-beam. Optic L3 is configured to direct the collimated redirected spot-beam through a discrete aperture. In an embodiment, N optical channels are spaced every 360/N degrees around the circumference of the conical shape. Each channel includes an Optic L2 and Optic L3 that guide the redirected spot-beam through a discrete aperture in a support member to scan 360/N degrees of the FOV.

The fixed mirror has a "conical shape", which is defined as "of, relating to, or shaped like a cone." A cone is defined as an axis perpendicular to a circular base, an apex located on the axis, and a surface that is the locus of straight lines from the apex to the perimeter of the circular base (C1). In different embodiments, the conical shape of the fixed mirror may be a cone (C1), a normal cone (CN1) in which the axis intersects the base in the center of the circle and the surface is rotationally symmetric about the axis, a piecewise linear (PWL) approximation of a cone C1 or CN1, a cone plus a powered optic (C2), PWL of a cone C1 or CN1 plus a powered optic (P2), a truncated cone (C3), a truncated PWL approximation of a cone (P3), a truncated cone plus a powered optic (C4), a truncated PWL approximation of a cone plus a powered optic (P4), and either the cone or PWL approximation of a cone plus focusing optic L1. Any of the above conical shapes can be combined to create an acceptable conical shape for the fixed mirror (i.e. a polygon base with a curved surface formed by the locus of curved lines from the apex to the perimeter of the polygon base).

In an embodiment, the controller issues command signals to steer the spot-beam in a circle around the conical shape and to vary the radius of the circle to move around the conical shape along the optical axis to scan a 360-degree region in Phi and a defined FOV in the X-Y plane (i.e., Theta Z'). If the conical shape is configured to reflect the spot-beam perpendicular to the optical axis, the beam scans a 360-degree horizontal FOV and a defined vertical FOV.

In an embodiment, the controller issues command signals to steer the spot-beam to discrete Theta X, Theta Y to cause the redirected spot-beam to jump between multiple objects in the FOV. The response time of the LCWG allows multiple objects to be illuminated per frame. The controller may issue the command signals to vary the dwell times on different objects.

In an embodiment, the controller issues command signals in an acquisition mode to scan a defined FOV to acquire objects and then issues command signals to move the spot-beam discretely from one object to the next to track the objects, suitably multiple objects per frame. The objects do not need to be tracked in sequential order, but can instead be tracked according to priority determined by the controller.

In an embodiment, the controller is responsive to an external signal to remove the effects of that signal to maintain the scan of a specified FOV or object.

These and other features and advantages of the invention will be apparent to those skilled in the art from the following detailed description of preferred embodiments, taken together with the accompanying drawings, in which:

DETAILED DESCRIPTION OF THE INVENTION

The present invention provides an active situational sensor that achieves SWaP-C and SNR improvements by scanning a spot-beam with no moving parts. The sensor may rapidly scan a 360° horizontal FOV with a specified vertical FOV or any portion thereof, jump discretely between multiple specific objects per frame, vary the dwell time on an object or compensate for other external factors to tailor the scan to a particular application or changing real-time conditions. The axis of the sensor may be positioned in any horizontal or vertical direction and the sensor may rapidly scan a 360° field of view in the plane perpendicular to the axis of the sensor with a specified vertical field of view perpendicular to the plane of the scan. The plane perpendicular to the axis of the sensor is referred to as the "horizontal plane" in the remainder of this document, however, this plane does not have to be oriented horizontal (perpendicular to the direction of gravity), for the sensor to function. The sensor can be used to provide object intensity or ranging in complex, dynamic systems such as aviation, air traffic control, ship navigation, unmanned ground vehicles, collision avoidance, object targeting etc.

Figure 1:
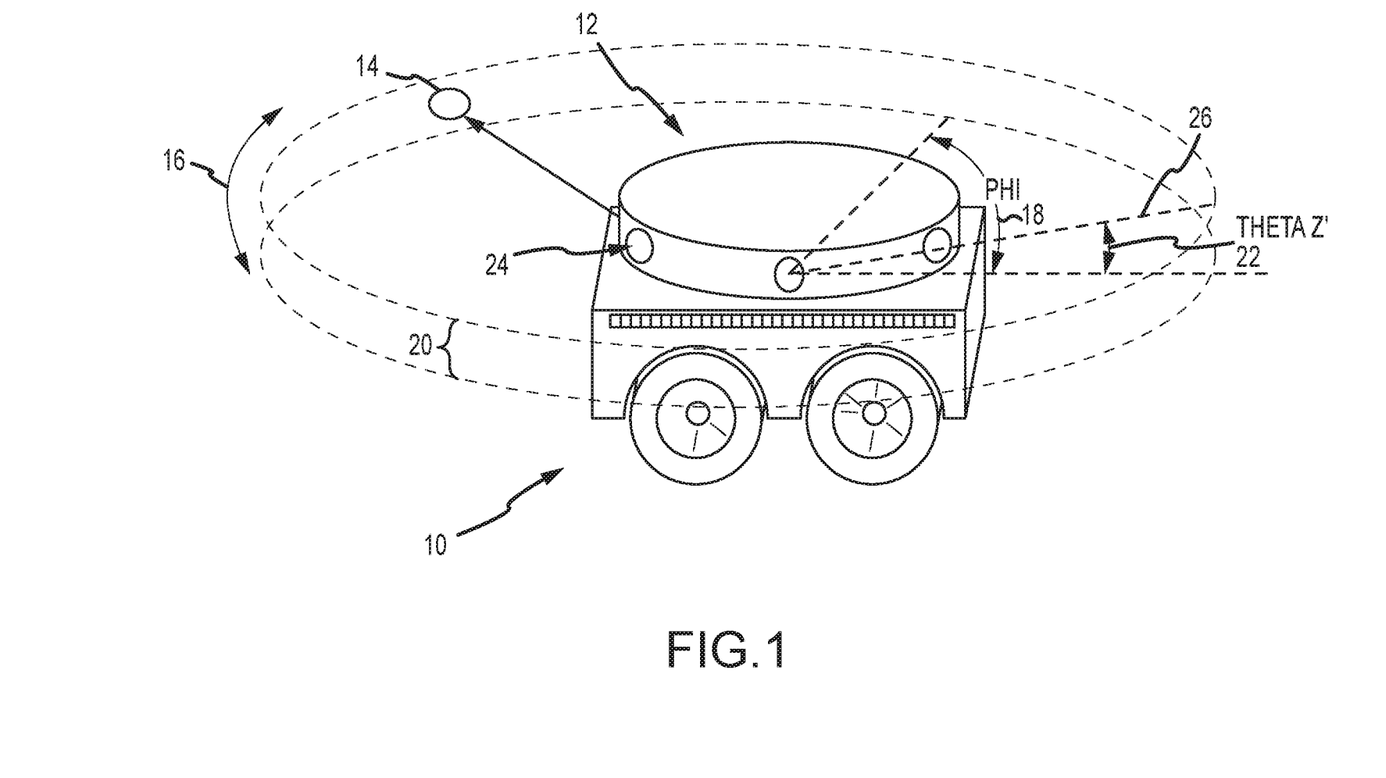
FIG. 1 is a diagram of an unmanned ground vehicle (UGV) provided with a LCWG steered situational awareness sensor of the present invention.
Figure 2A:
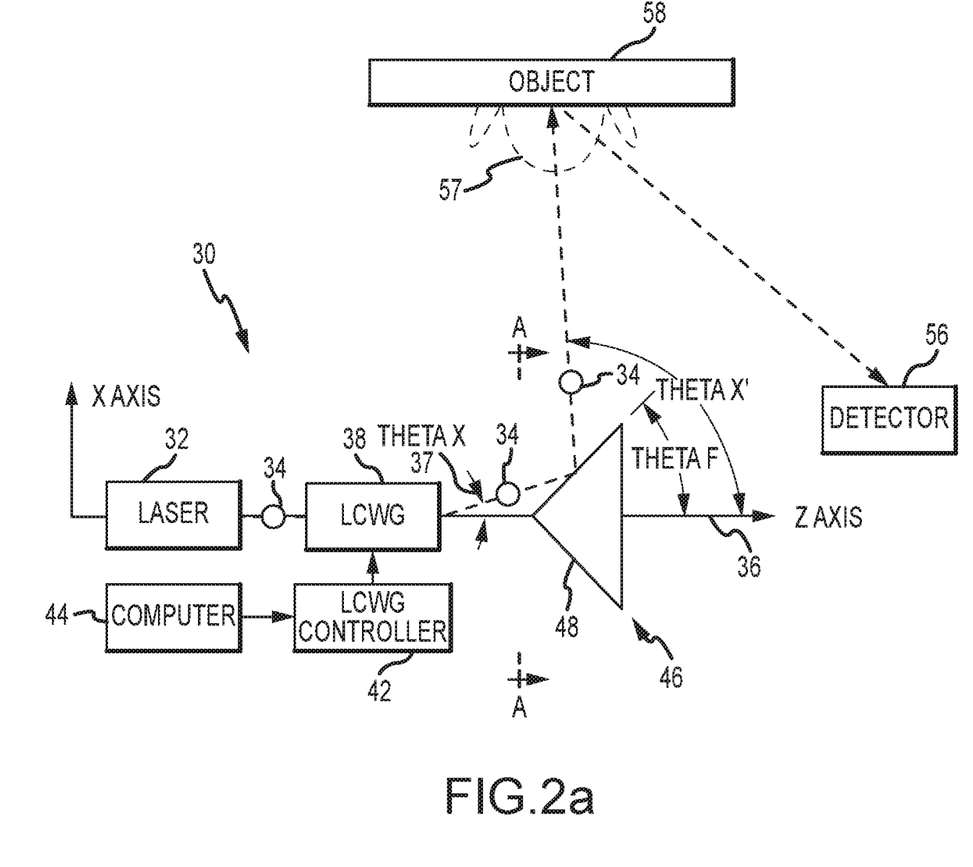
FIGS. 2a-2d are top, side, section A-A and section B-B views of an embodiment of a LCWG steered situational awareness sensor.
Figure 2B:
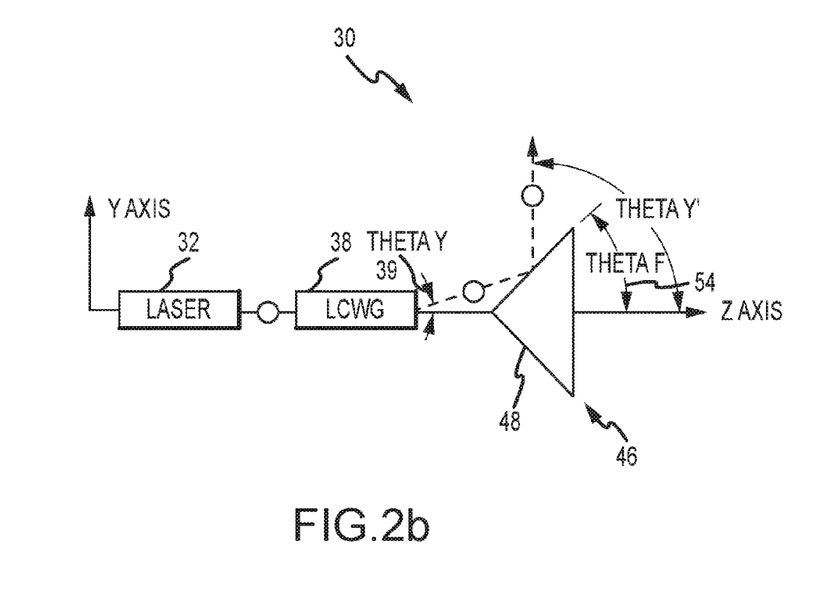
Figure 2C:
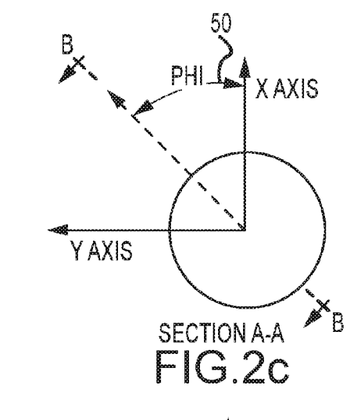
Figure 2D:
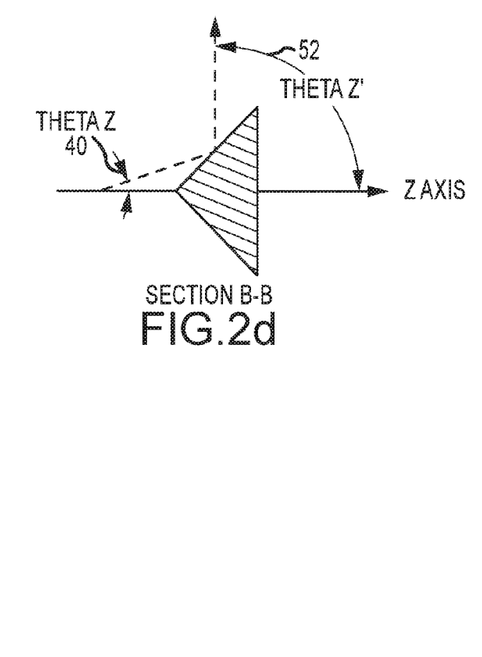
Figure 3:
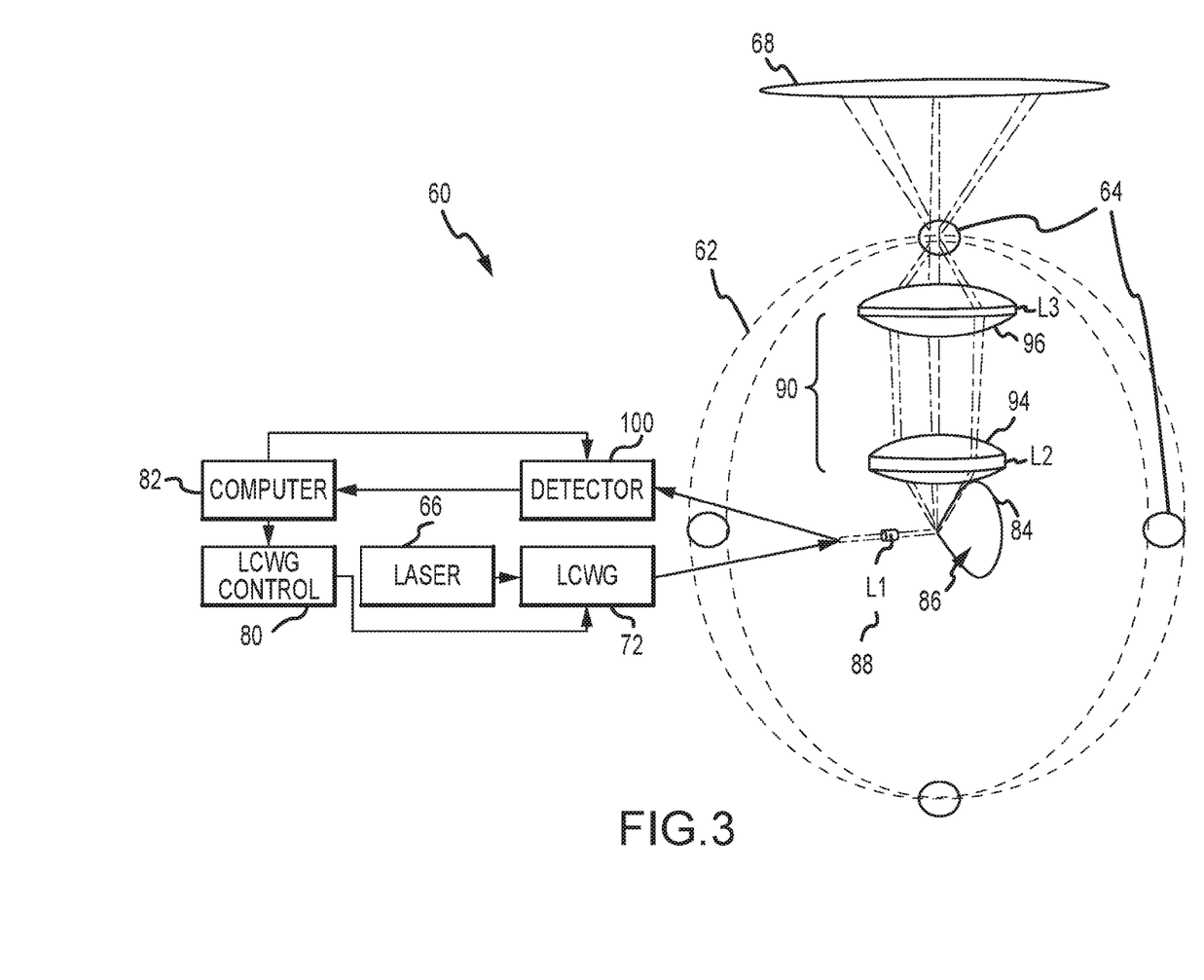
FIG. 3 is a diagram of another embodiment of a LCWG steered situational awareness sensor including optics L1, L2 and L3 for scanning the redirected spot-beam through discrete apertures.
Figure 4A:
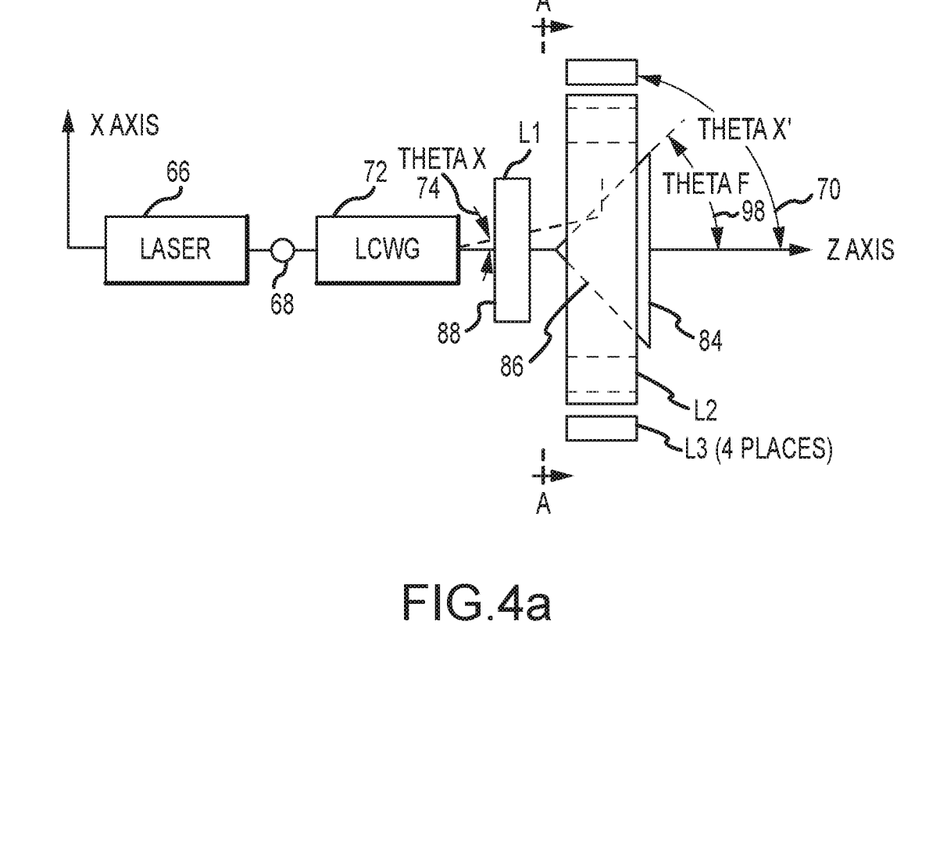
FIGS. 4a-4d are top, side, section A-A and section B-B views of the situational awareness sensor of FIG. 3.
Figure 4B:
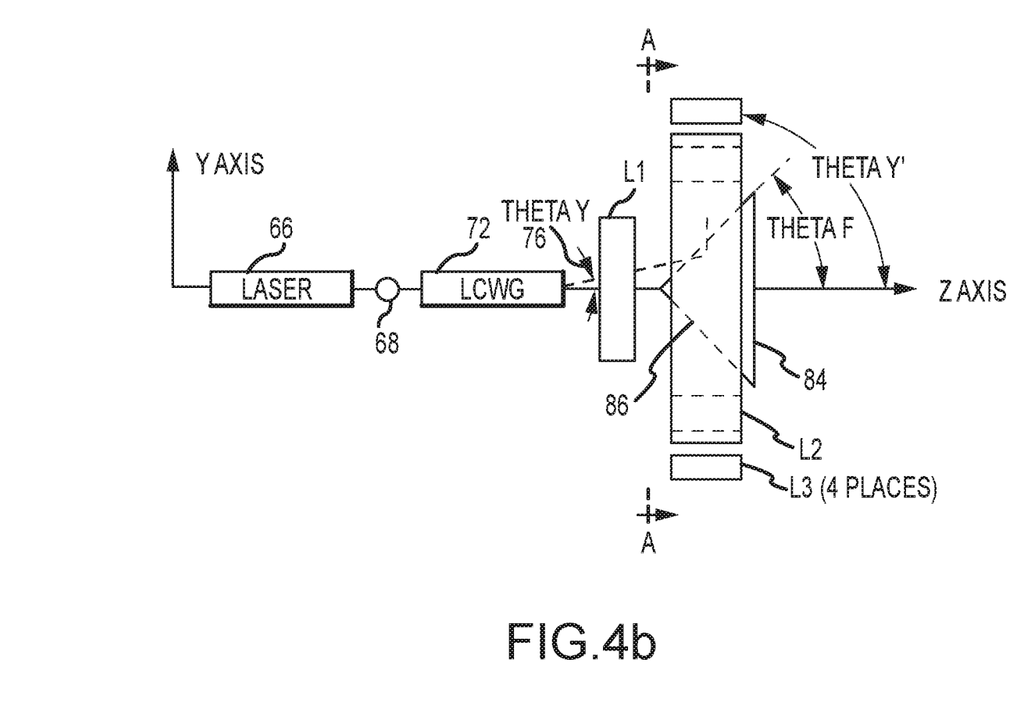
Figure 4C:
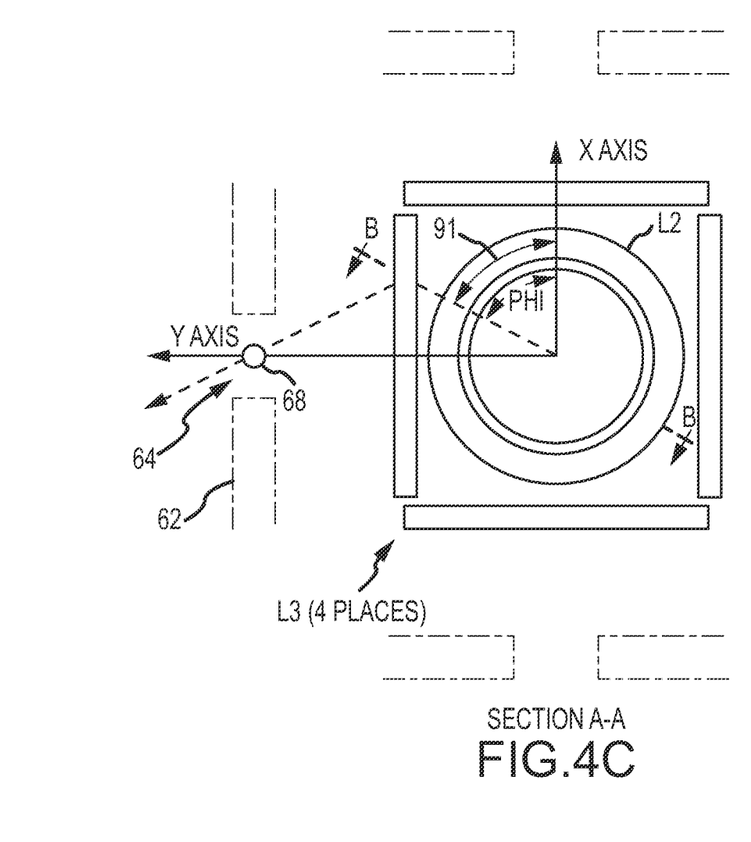
Figure 4D:
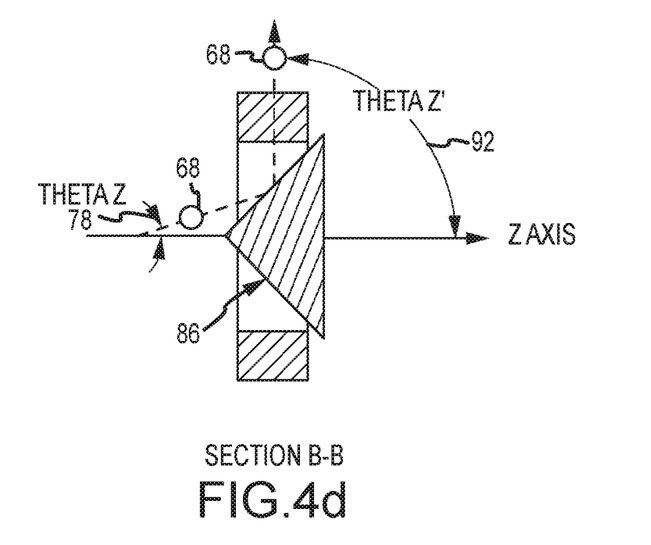

Referring now to FIG. 1, in an embodiment an unmanned ground vehicle (UGV) 10 is outfitted with an active situational awareness sensor 12. Sensor 12 is capable of scanning a collimated spot-beam 14 over a 360° FOV 16 in angle Phi 18 and a defined FOV 20 in angle Theta Z' 22, typically 2 to 20 degrees. In a specific configuration, the FOVs in angle Phi 18 and Theta Z' 22 correspond to horizontal and vertical FOV, respectively. In other embodiments, sensor 12 may be configured to scan a reduced FOV. For example, in some applications the sensor may need to only scan a forward 180° FOV.

Sensor 12 comprises a laser, a LCWG, a fixed mirror, a LCWG controller, a computer, various optical components and a detector housed in a structural housing 24. One or more apertures 26 are formed in housing 24 to facilitate scanning spot-beam 14 over the FOV. To scan the 360° FOV 16, the housing may have a single continuous ring aperture or multiple discrete apertures placed every 360/N degrees.

The laser (CW or pulsed) is configured to generate a collimated spot-beam 14 along an optical axis that is oriented in the Z direction. The LCWG is oriented along the optical axis and is responsive to command signals from the LCWG controller to steer the spot-beam 14 about the optical axis in two dimensions. The fixed mirror has a conical shape oriented along the optical axis and redirects the spot-beam 14 to a location Phi and Theta Z' in the FOV. The various optical components are configured, at least in part, based on the particular aperture configuration of the sensor to scan the spot-beam 14 over the FOV. The detector is configured to sense a reflected component of the spot-beam, which can be processed to provide intensity or range.

The combination of the LCWG and fixed conic mirror to steer and redirect a laser spot-beam provides many advantages over known active situational awareness sensors. The SWaP-C benefits of using a single laser to produce a spot-beam without mechanical or rotary scanning are considerable. The use of a scanned spot-beam significantly reduces atmospheric backscatter, thus improving SNR. Additionally, replacing mechanical scanning with solid-state steering via the LCWG provides considerable flexibility for operating the sensor. Whereas the mechanically or rotary scanned sensors are limited to continuously scanning the same 360° horizontal FOV over and over, the LCWG steered sensor may rapidly scan a 360° horizontal FOV with a specified vertical FOV or any portion thereof, jump discretely between multiple specific objects per frame, vary the dwell time on an object or compensate for other external factors to tailor the scan to a particular application or changing real-time conditions.

U.S. Pat. No. 8,380,025 entitled "Liquid Crystal Waveguide Having Refractive Shapes for Dynamically Controlling Light" assigned to Vescent Photonics, Inc. is hereby incorporated by reference. The patent discloses a LCWG that is configurable to form and scan a laser spot over a FOV in a frame time to provide a relative illumination for optical Non Uniformity Correction (NUC) of active mode image sensors. A time varying voltage is applied to the LCWG to modulate the liquid crystal material in order to form and position the laser spot according to the specified scan pattern. Liquid crystal waveguides dynamically control the refraction of light. Generally, liquid crystal materials may be disposed within a waveguide in a cladding proximate or adjacent to a core layer of the waveguide. In one example, portions of the liquid crystal material can be modulated to form refractive optical component shapes (e.g. lenses or prisms) in the cladding that interact with a portion (specifically the evanescent field) of light in the waveguide so as to permit electronic control of the refraction/bending, focusing, or defocusing of light as it travels through the waveguide.

In one example, a waveguide may be formed using one or more patterned or shaped electrodes that induce formation of such refractive shapes of liquid crystal material, or alternatively, an alignment layer may have one or more regions that define such refractive or lens shapes to induce formation of refractive or lens shapes of the liquid crystal material. The electrodes are positioned within the LCWG and oriented according to the shape of the LCWG core such that each electrode modulates the liquid crystal material for a different direction of steering (i.e. one electrode steers positive theta X, another steers negative theta X and a third steers in theta Y). In another example, such refractive shapes of liquid crystal material may be formed by patterning or shaping a cladding to define a region or cavity to contain liquid crystal material in which the liquid crystal materials may interact with the evanescent light. The LCWG controller includes command and synchronization electronics that receive a start of frame/row from a Read Out Integrated Circuit (ROIC) and generate analog drive signals that specify the scan pattern and a drive controller that converts the analog drive signals to a high frequency, high voltage drive signal applied to the LCWG. These command and synchronization electronics may also synchronize the pulses from the laser source.

Referring now to FIGS. 2a through 2d, an embodiment of an active situational awareness sensor 30 comprises a laser 32 configured to generate a collimated spot-beam 34 along an optical axis 36 that is oriented in the Z direction. A LCWG 38 is oriented along the optical axis and is responsive to command signals to steer the spot-beam 34 about the optical axis to a location Theta X 37 and Theta Y 39 from the optical axis where Theta X is the angle between the projection of the instantaneous location of the axis of the spot-beam on the X-Z plane and the Z-axis and Theta Y is the angle between the instantaneous location of the axis of the spot-beam on the Y-Z plane and the Z-axis. Theta Z 40 is the angle between the projection of the instantaneous location of the axis of the steered spot-beam and the Z-axis.

Because of the rotational symmetry, the position of the X-axis is, more or less, arbitrary. In this description, X is parallel to the "in plane" steering direction of the waveguide and Y is parallel to the "out of plane" steering direction of the waveguide. Making X parallel to the in plane steering direction of the waveguide simplifies the description, but it does not have to be in this location, there is a straightforward transform to relate any choice of X to the in plane steering direction.

A controller 42 is configured to issue command signals to the LCWG 38 to steer the spot-beam 34 to the desired Theta X and Theta Y. A computer 44 is configured to issue signals to the controller 42 that provide the desired Theta X and Theta Y to implement a continuous scan, illumination of multiple discrete objects, variable dwell time, compensation for an external signal etc.

A fixed mirror 46 has a conical shape 48 oriented along the optical axis 36 (coincident with or offset from in different configurations) to redirect the spot-beam 34 to a location Phi 50 and Theta Z' 52 where Phi is the angle between the projection of the instantaneous location of the axis of the redirected spot-beam on the X-Y plane and the X-axis and Theta Z' is the angle between the projection of the instantaneous location of the axis of the redirected spot-beam and the Z-axis. Theta Z' 52 is greater than Theta Z 40. The redirected spot-beam 34 scans a FOV defined by the values of Phi and Theta Z'. Theta X' is the angle between the projection of the instantaneous location of the axis of the redirected spot-beam on the X-Y plane and the Z-axis and Theta Y' is the angle between the instantaneous location of the axis of the redirected and the Z-axis.

Steering spot-beam 34 in a circle (i.e. a constant Theta Z) around the conical shape scans the redirected spot-beam 34 around a 360° FOV in Phi. Varying the radius of the circle (i.e. changing the constant value of Theta Z) scans the redirected spot-beam 34 in a defined FOV in Theta Z'. The angle Theta F 54 of the conical shape 48 of fixed mirror 46 may or may not be configured such that the spot-beam 34 is redirected perpendicular to optical axis 36. When Theta F produces a Theta Z' perpendicular to the Z-axis, the situational awareness sensor has a two-dimensional band of coverage comprised of Phi and Theta Z' that is centered on the Z axis along with the fixed mirror 46. Increasing or decreasing Theta F increases or decreases the nominal Theta Z', respectively. This shifts the two-dimensional band of coverage comprised of Phi and Theta Z' along the Z axis.

The ability to control the redirection of the spot-beam allows the total field of regard (FOR) of the sensor to be optimized. For example, if the FOR is a volume on top of a flat surface the sensor can be placed near the surface and the spot-beam directed perpendicular to the optical axis to maximize the volume of the FOR. In a second example, if the FOR is a circularly shaped region (perimeter) on top of a flat surface, the sensor can be placed above the ground and the spot-beam directed down to scan the circularly shaped region of interest. In a third example, if the sensor is in the front of a moving vehicle, the sensor axis can be directed in the forward direction and the spot-beam directed up to scan the volume in front of the moving vehicle to detect objects in front of the vehicle.

A detector 56 is configured to sense a reflected component 57 of the spot-beam reflected from an object 58. The reflected component may be processed to provide an intensity of the illuminated object or a range to the illuminated object.

The fixed mirror 46 has a "conical shape" 48, which is defined as "of, relating to, or shaped like a cone." A cone is a three dimensional geometric shape described by a circular base, an axis perpendicular to a circular base, an apex located on the axis, and a surface that is the locus of straight lines from the apex to the perimeter of the circular base (C1). A "normal" cone (CN1) is a cone in which the axis intersects the base in the center of the circle and the surface is rotationally symmetric about the axis.

A piecewise linear approximation (P1) of a cone (C1 or CN1) is three dimensional geometric shape described by a base that is a polygon with 3 or more sides, an axis perpendicular to the base, an apex located on the axis and a surface that is the locus of straight lines from the apex to perimeter of the base. If the axis is located at the center of the polygon, the geometric shape is rotationally symmetric about the axis.

A cone (C1 or CN1) plus a powered optic (C2) is a three dimensional geometric shape described by a circular base, an axis perpendicular to the base, an apex located on the axis and a surface that is the locus of lines that curve in planes that are parallel to the axis from the apex to perimeter of the base. Because the mirror's surface is curved, the spot size is actually different at different locations on the mirror. This causes some distortions in the far field and extra beam divergence. Using an aspherical surface helps correct this. The effect is reduced with more apertures.

A PWL approximation of a cone (C1 or CN1) plus a powered optic (P2) is a three dimensional geometric shape described by a base that is a polygon with 3 or more sides, an axis perpendicular to the base, an apex located on the axis and a surface that is the locus of lines that curve in planes that are parallel to the axis from the apex to perimeter of the base.

A truncated cone (C3) is a three dimensional geometric shape described by a circular base, an axis perpendicular to the base, a top described by a circle and a surface that is the locus of straight lines parallel to the axis from the perimeter of the top to perimeter of the base.

A truncated PWL approximation of a cone (P3) is a three dimensional geometric shape described by a base that is a polygon with 3 or more sides, an axis perpendicular to the base, a top described by a polygon of 3 or more sides and a surface that is the locus of straight lines from the perimeter of the top to perimeter of the base.

A truncated cone plus a powered optic (C4) is a three dimensional geometric shape described by a circular base, an axis perpendicular to the base that intersects the base in the center of the circle, a top described by a circle and a surface that is the locus of lines that curve in planes that are parallel to the axis from the perimeter of the top to perimeter of the base.

A truncated PWL approximation of a cone plus a powered optic (P4) is a three dimensional geometric shape described by a base that is a polygon with 3 or more sides, an axis perpendicular to the base, a top described by a polygon of 3 or more sides and a surface that is the locus of lines that curve in planes that are parallel to the axis from the perimeter of the top to perimeter of the base.

Any of the above conical shapes can be combined to create an acceptable conical shape for the fixed mirror (i.e. a polygon base with a curved surface formed by the locus of curved lines from the apex to the perimeter of the polygon base). Any of the above conical shapes may be combined with focusing optic L1.

Any of the above conical shapes are subject to manufacturing tolerances of the fixed mirror. A conical shape, such as a normal cone, that is designed to be rotationally symmetric about the axis may deviate from such symmetry within the manufacturing tolerances. Alternately, a conical shape may be designed with the axis intentionally offset from the center of the base (circle or polygon) in order to scan a particular FOV. Another alternative is to use the LCWG to vary Theta Z as a function of Phi in order to scan a particular FOV with any conical shape.

Referring now to FIGS. 3 and 4a through 4d, an embodiment of an active situational awareness sensor 60 comprises a housing 62 having four discrete apertures 64 formed about its circumference at 90° (360°/4) intervals. The housing comprises a structural member configured to provide support primarily in the direction parallel to the sensor axis.

A laser 66 is configured to generate a collimated spot-beam 68 along an optical axis 70 that is oriented in the Z direction. A LCWG 72 is oriented along the optical axis and is responsive to command signals to steer the spot-beam 68 about the optical axis to a location Theta X 74 and Theta Y 76 from the optical axis where Theta X is the angle between the projection of the instantaneous location of the axis of the spot-beam on the X-Y plane and the Z-axis and Theta Y is the angle between the instantaneous location of the axis of the spot-beam and the Z-axis such that Theta X is in the plane of the X-axis and Theta Y is in the plane of the Y-axis. Theta Z 78 is the angle between the projection of the instantaneous location of the axis of the steered spot-beam and the Z-axis. Because of the rotational symmetry, the position of the X axis is, more or less, arbitrary.

A controller 80 is configured to issue command signals to the LCWG 72 to steer the spot-beam 68 to the desired Theta X and Theta Y. A computer 82 is configured to issue signals to the controller 80 that provide the desired Theta X and Theta Y to implement a continuous scan, illumination of multiple discrete objects, variable dwell time, compensation for an external signal etc.

A fixed mirror 84 has a conical shape 86 that is oriented along the optical axis 70. In this particular configuration, conical shape 86 is a normal cone (CN1) that is rotationally symmetric about its axis, which is coincident with the optical axis 70. The tip of the cone is positioned towards the LCWG with the radius of the cone increasing along the axis away from the LCWG. An optic L1 88 is configured to focus the collimated spot-beam 68 onto the conical shape of the fixed mirror, which in turn redirects the spot-beam 68. Optic L1 is suitably configured so that its focal point is at the conical shape of the fixed mirror. This creates the minimum spot size on the conical surface. Since the round beam is actually being projected onto a curved surface, there is distortion of the beam due to the mirror's surface. Keeping the spot small makes the spot project on a "localized flat" surface. Optic L1 could be integrated into conical shape 86.

Four optical channels 90 are positioned between fixed mirror 84 and a different one of the apertures 64 in the housing 62 to guide the redirected spot-beam 68 through the corresponding aperture 64 to a location Phi 91 and Theta Z' 92 where Phi is the angle between the projection of the instantaneous location of the axis of the redirected spot-beam on the X-Y plane and the X axis and Theta Z' is the angle between the projection of the instantaneous location of the axis of redirected spot-beam on the Z axis. Theta Z' 92 is greater than Theta Z 78. The redirected spot-beam 68 scans a FOV defined by the values of Phi and Theta Z'.

Each optical channel 90 comprises an optic L2 94 and an optic L3 96. Optic L2 is of larger diameter to collect light coming off the mirror at +/−45 degrees (nominally). A smaller optic is achieved using more and smaller apertures. Optic L2 is placed at approximately its focal length from the mirror to collimate the light. Optic L3 is a fast (low F/#, short focal length) lens that quickly causes the light to cross and diverge out of the aperture.

Steering spot-beam 68 in a circle (constant Theta Z) around the conical shape scans the redirected spot-beam 68 from one aperture 64 to the next around a 360° FOV in Phi. Varying the radius of the circle scans the redirected spot-beam 68 in a defined FOV in Theta Z'. The angle Theta F 98 of the conical shape 86 of fixed mirror 84 may or may not be configured such that the spot-beam 64 is redirected perpendicular to optical axis 70.

A detector 100 is configured to sense a reflected component of the spot-beam. The reflected component may be processed to provide an intensity of the illuminated object or a range to the illuminated object.

Figure 5:
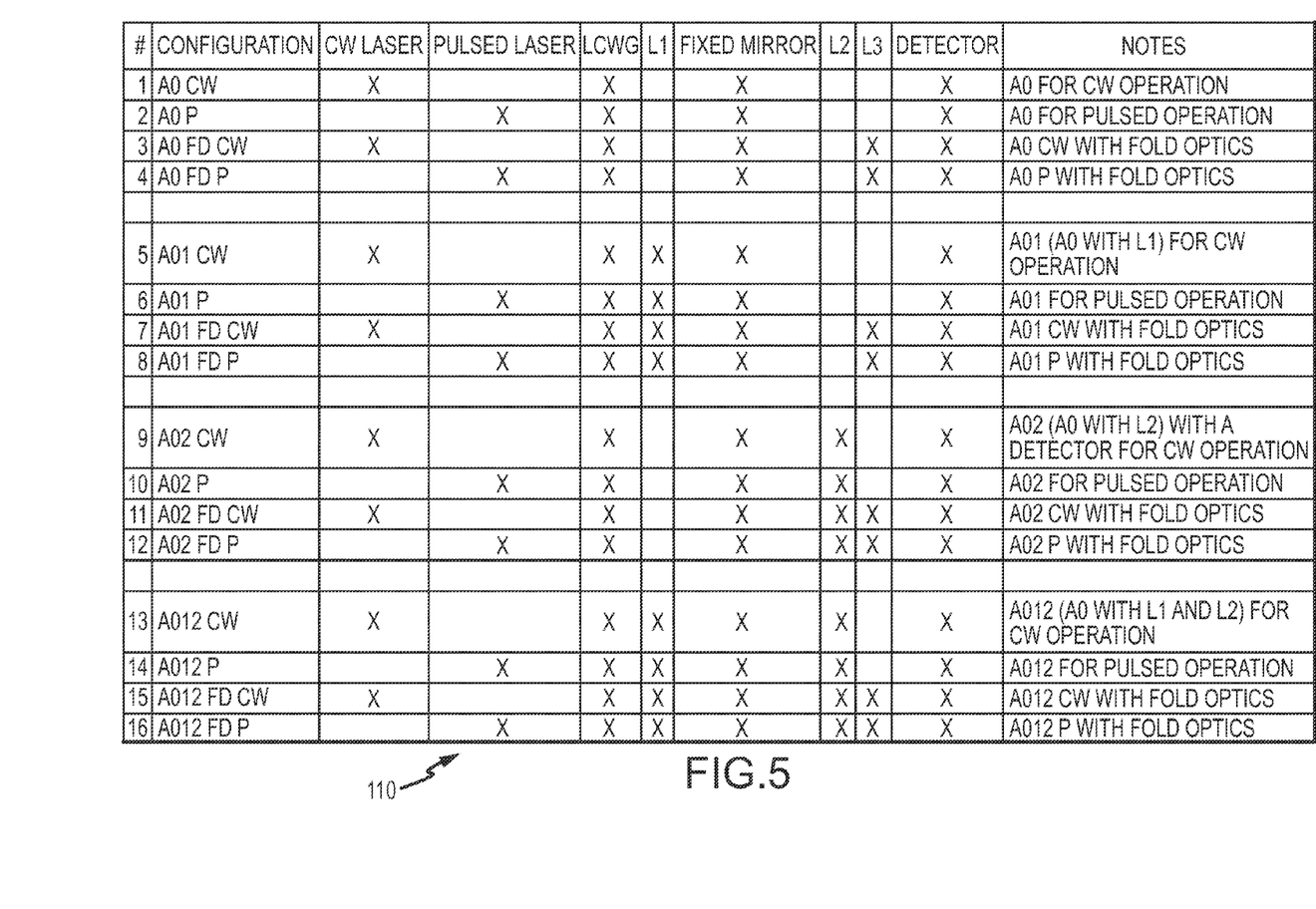
FIG. 5 is a table of different configurations of the LCWG steered situational awareness sensor.

Referring now to FIG. 5, table 110 enumerates a number of different sensor configurations that use a LCWG and fixed mirror with a conical shape to steer and redirect a laser spot-beam to scan a FOV. For example, the embodiment described in FIGS. 2a-2d represents configurations 1 and 2 in the Table for continuous wave (CW) and pulsed operation of the laser. The embodiment described in FIGS. 3 and 4a-4d represents configurations 15 and 16 in the Table for CW and pulsed operation of the laser. There are many different sensor configurations based on the mode of operation of the laser and the optics L1, L2 and L3. The term A0 is an arbitrary designator for the base configuration 1. A01 uses the A0 configuration with the addition of L1. A02 uses the A0 configuration with the addition of L2. A012 uses the base configuration with the addition of L1 and L2. The suffix CW indicates a CW laser beam while the suffix P indicates a pulsed laser beam. The suffix FD indicates fold optics present (the use of L3 to fold the laser beam through an aperture). Depending on the application one of the configurations may be more desirable than the other configurations.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. A situational awareness sensor, comprising:
   a laser configured to generate a collimated spot-beam along an optical axis that is oriented in the Z direction;
   a liquid crystal waveguide (LCWG) along the optical axis responsive to command signals to steer the spot-beam about the optical axis to a location Theta X and Theta Y from the optical axis where Theta X is the angle between the projection of the instantaneous location of the axis of spot-beam on the X-Z plane and the Z axis and Theta Y is the angle between the instantaneous location of the axis of the spot-beam on the Y-Z plane and the Z axis, Theta Z is the angle between the projection of the instantaneous location of the axis of the steered spot-beam and the Z axis;
   a controller configured to issue command signals to the LCWG to steer the spot-beam to the desired Theta X and Theta Y;
   a fixed mirror having a conical shape oriented along the optical axis that redirects the spot-beam to a location Phi and Theta Z' where Phi is the angle between the projection of the instantaneous location of the axis of the redirected spot-beam on the X-Y plane and the X axis and Theta Z' is the angle between the projection of the instantaneous location of the axis of redirected spot-beam on the Z axis and Theta Z' is greater than Theta Z, wherein the redirected spot-beam scans a field-of-view (FOV) defined by the values of Phi and Theta Z'; and
   a detector configured to sense a reflected component of the spot-beam.

2. The sensor of claim 1, wherein an angle Theta F of the conical shape of the fixed mirror is configured to redirect the spot-beam perpendicular to the optical axis.

3. The sensor of claim 1, wherein the conical shape of the fixed mirror is a normal cone in which the surface of the cone is rotationally symmetric about the optical axis.

4. The sensor of claim 1, wherein the conical shape is a piecewise linear approximation of a cone in which the base of the cone is represented by a polygon.

5. The sensor of claim 1, wherein the conical shape includes an aspheric curvature.

6. The sensor of claim 1, wherein the conical shape includes an optic L1 to focus the spot-beam on the conical shape.

7. The sensor of claim 1, further comprising an optic L1 between the LCWG and the fixed mirror to focus the collimated spot-beam onto the conical shape of the fixed mirror.

8. The sensor of claim 7, further comprising
   a structural member configured to provide support primarily in the direction parallel to the sensor axis, said structural support having N discrete apertures formed therein at 360/N degree intervals; and
   N transport optic channels placed around the fixed mirror at 360/N degree intervals, each channel comprising an optic L2 configured to collimate the redirected spot-beam and an optic L3 configured to direct the collimated redirected spot-beam through the corresponding aperture.

9. The sensor of claim 1, wherein the controller issues command signals to steer the spot-beam in a circle around the conical shape and to vary the radius of the circle to move back-and-forth on the conical shape along the optical axis to scan a 360 degree region in phi and a defined FOV in the X-Y plane.

10. The sensor of claim 9, wherein an angle Theta F of the conical shape of the fixed mirror is configured to redirect the spot-beam perpendicular to the optical axis such that the spot-beam scans a 360 degree horizontal FOV and a defined vertical FOV.

11. The sensor of claim 1, wherein the controller issues command signals to steer the spot-beam to discrete theta X and theta Y to cause the redirected spot-beam to jump between multiple discrete objects in the FOV.

12. The sensor of claim 11, wherein the controller issues command signals to illuminate multiple discrete objects within a single frame time.

13. The sensor of claim 11, wherein the controller issues command signals to vary the dwell times on different discrete objects.

14. The sensor of claim 1, wherein the controller issues command signals in an acquisition mode to scan a defined FOV to acquire objects and then issues command signals to move the spot-beam discretely from one object to the next to track multiple objects per frame.

15. The sensor of claim 1, wherein the controller issues command signals responsive to an external signal to remove the effects of the external signal to maintain the scan of the FOV or object.

16. A situational awareness sensor, comprising:
   a laser configured to generate a collimated spot-beam along an optical axis that is oriented in the Z direction;
   a liquid crystal waveguide (LCWG) along the optical axis responsive to command signals to steer the spot-beam about the optical axis to a location Theta X and Theta Y from the optical axis where Theta X is the angle between the projection of the instantaneous location of the axis of spot-beam on the X-Z plane and the Z axis and Theta Y is the angle between the instantaneous location of the axis of the spot-beam on the Y-Z plane and the Z axis, Theta Z is the angle between the projection of the instantaneous location of the axis of the steered spot-beam and the Z axis;
   a controller configured to issue command signals to the LCWG to steer the spot-beam to the desired Theta X and Theta Y;
   an optic L1 that focuses the collimated spot-beam
   a fixed mirror having a conical shape that is rotationally symmetric about the optical axis that redirects the focused spot-beam perpendicular to the optical axis to a location Phi and Theta Z' where Phi is the angle between the projection of the instantaneous location of the axis of the redirected spot-beam on the X-Y plane and the X axis and Theta Z' is the angle between the projection of the instantaneous location of the axis of redirected spot-beam on the Z axis and Theta Z' is greater than Theta Z;

a structural member configured to provide support primarily in the direction parallel to the sensor axis, said structural member having N discrete apertures formed therein at 360/N degree intervals;

N transport optic channels placed around the fixed mirror at 360/N degree intervals, each channel comprising an optic L2 configured to collimate the redirected spot-beam and an optic L3 configured to direct the collimated redirected spot-beam through the corresponding aperture such that the redirected spot-beam scans a field-of-view (FOV) defined by the values of Phi and Theta Z'; and a detector configured to sense a reflected component of the spot-beam.

17. A situational awareness sensor, comprising:

a laser configured to generate a collimated spot-beam along an optical axis;

a liquid crystal waveguide (LCWG) along the optical axis responsive to command signals to steer the spot-beam in two-dimensions about the optical axis;

a controller configured to issue command signals to the LCWG to steer the spot-beam;

a fixed mirror having a conical shape oriented along the optical axis that redirects the spot-beam to scan a two-dimensional field-of-view (FOV); and a detector configured to sense a reflected component of the spot-beam.

18. The sensor of claim 17, further comprising an optic L1 between the LCWG and the fixed mirror to focus the collimated spot-beam onto the conical shape of the fixed mirror.

19. The sensor of claim 17, further comprising a structural member configured to provide support primarily in the direction parallel to the sensor axis, said structural member having N discrete apertures formed therein at 360/N degree intervals; and N transport optic channels placed around the fixed mirror at 360/N degree intervals, each channel comprising an optic L2 configured to collimate the redirected spot-beam and an optic L3 configured to direct the collimated redirected spot-beam through the corresponding aperture.

* * * * *